US010044470B2

(12) United States Patent
Oksman et al.

(10) Patent No.: US 10,044,470 B2
(45) Date of Patent: Aug. 7, 2018

(54) HEADER ALIGNMENT IN COMMUNICATION SYSTEM

(75) Inventors: Vladimir Oksman, Morganville, NJ (US); Joon Bae Kim, Lexington, MA (US)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 13/979,372

(22) PCT Filed: Jan. 11, 2012

(86) PCT No.: PCT/EP2012/000105
§ 371 (c)(1),
(2), (4) Date: Jul. 11, 2013

(87) PCT Pub. No.: WO2012/095309
PCT Pub. Date: Jul. 19, 2012

(65) Prior Publication Data
US 2013/0287045 A1    Oct. 31, 2013

Related U.S. Application Data

(60) Provisional application No. 61/431,614, filed on Jan. 11, 2011.

(51) Int. Cl.
*H04J 3/24* (2006.01)
*H04L 1/00* (2006.01)
(Continued)

(52) U.S. Cl.
CPC ............ *H04L 1/0083* (2013.01); *H04B 3/54* (2013.01); *H04L 12/2838* (2013.01);
(Continued)

(58) Field of Classification Search
CPC ...... H04W 28/00; H04W 52/06; H04B 7/005; H04L 29/08
(Continued)

(56) References Cited

U.S. PATENT DOCUMENTS 8,457,260 B2 * 6/2013 Khandekar ........... H04W 52/52
375/345
2004/0001508 A1   1/2004 Zheng et al.
(Continued)

FOREIGN PATENT DOCUMENTS

WO     2011/022593 A1    2/2011

OTHER PUBLICATIONS

Stefano Galli et al: "The inter-PHY protocol (IPP): A simple coexistence protocol for shared media", Power Line Communications and Its Applications, 2009. ISPLC 2009. IEEE International Symposium on, IEEE, Piscataway, NJ, USA, Mar. 29, 2009 (Mar. 29, 2009), pp. 194-200, XP031453685, ISBN: 978-1-4244-3790-0.
(Continued)

*Primary Examiner* — Yemane Mesfin
*Assistant Examiner* — Abdelillah Elmejjarmi
(74) *Attorney, Agent, or Firm* — Eschweiler & Potashnik, LLC (57) ABSTRACT

Representative implementations of devices and techniques provide communication between networked nodes operating on a communication network medium. In an implementation, a node generates a broadcast frame that includes at least a preamble and a payload. The preamble of the broadcast frame may include supplemental information. The supplemental information may be associated with one or more symbols of the preamble. The supplemental information may contain predetermined header information for use by nodes operating on the communication network medium.

13 Claims, 6 Drawing Sheets

(51) Int. Cl.
*H04B 3/54* (2006.01)
*H04L 12/28* (2006.01)

(52) U.S. Cl.
CPC ............... *H04B 2203/5408* (2013.01); *H04B 2203/5416* (2013.01); *H04B 2203/5445* (2013.01); *H04L 2012/2843* (2013.01)

(58) Field of Classification Search
USPC .................. 370/310; 455/404.1; 375/222
See application file for complete search history.

(56) References Cited

U.S. PATENT DOCUMENTS

| | | | |
|---|---|---|---|
| 2004/0174851 A1 | 9/2004 | Zalitzky et al. | |
| 2006/0104341 A1* | 5/2006 | Magee | H04L 25/0226 375/231 |
| 2007/0064783 A1* | 3/2007 | Kuroda | H04W 16/10 375/222 |
| 2008/0117908 A1* | 5/2008 | Kuo | H04L 69/22 370/392 |
| 2010/0330951 A1* | 12/2010 | Chen | H04W 4/22 455/404.1 |

OTHER PUBLICATIONS

Oksman V et al: "G.hn: The new ITU-T home networking standard", IEEE Communications Magazine, IEEE Service Center, Piscataway, US, vol. 47, No. 10, Oct. 1, 2009 (Oct. 1, 2009), pp. 138-145, XPOI1283328, ISSN: 0163-6804, 001: 10. 1109/MCOM. 2009.5273821.

\* cited by examiner

HEADER ALIGNMENT IN COMMUNICATION SYSTEM

RELATED APPLICATIONS

Background

Power line Communication (PLC) is a communication technology that uses power lines as its communication medium. Data travels over the same power line that provides electricity, thus allowing the existing power line infrastructure in homes, businesses or cars to be used for the purpose of transporting data without adding new wires. PLC technology is experiencing a period of rapid growth and finding its way into multiple applications and market segments including smart grid, lighting control, solar panel monitoring, energy metering, in-home video distribution, and electric cars. The global push for energy conservation is driving the need for intelligently communicating with energy generation and energy consuming devices. PLC offers a unique no-new-infrastructure approach to enabling rapid deployment of smart energy management technology around the world. Unlike wireless solutions, PLC does not have limitations of line-of-sight and short transmission range. PLC is also a cast-effective and easy-to-install technology for many applications.

Broadband technologies provide high speed data transmission. However, currently it is problematic to apply broadband technologies in PLC. Some problems include the ability to efficiently decode signals in noisy channels, achieve time and frequency diversity, remove signal interference, maintain received signals at predetermined levels, measure channel quality for high transmission rate, provide robustness to wideband and narrow band symbol synchronization.

SUMMARY

Representative implementations of devices and techniques enable reliable communication between networked nodes operating on a communication network medium. In an implementation, a node, such as a controller or master node, generates a broadcast frame that includes at least a preamble, header and a payload. In one implementation, the header is a Frame Control Header (FCH) that may include frame configuration information, such as the usable subchannels, the modulation and coding scheme, and the Media Access Protocol (MAP) message length for the current frame. A portion of the broadcast frame may include an instruction requiring nodes that receive the broadcast frame to use a predetermined FCH. The instruction may be carried in any portion of the broadcast frame, or may be carried in a subsequent frame communicated by the controller node. Moreover, the instruction may provide the parameters associated with the predetermined FCH. A node in the communication network may use the received instruction to generate one or more transmit frames that include a predetermined FCH that is common to all nodes operating in the communication network.

The use of a predetermined FCH that is common to all or substantially all nodes operating in the communication network enables FCH alignment across all or substantially all nodes operating in a communication network environment, in particular, in one implementation, a node, such as a controller node, defines the parameters for the FCH, based on information from one or more sources, and communicates those parameters to nodes associated in the network environment. The nodes in the network use the parameters to generate a predetermined FCH in frames for communication to one or more destination nodes. Because all or substantially all nodes operating in the communication network environment are to use the predetermined FCH, noise and other signal disrupting influences have minimal effect on a node's ability to detect an FCH associated with one or more received frames from other nodes in the communication network environment.

The independent claims define the invention in various aspects. The dependent claims define embodiments according to the invention.

In a first aspect, the invention encompasses a method, comprising decoding, at a node, a mobile application protocol (MAP) physical layer (PHY) frame, generating a transmit frame, and transmitting the transmit frame. The MAP PHY frame includes one or more symbols carrying supplemental information that includes information associated with a predetermined header for use by a plurality of nodes communicatively coupled to a communication network medium. The transmit frame—herein also referred to as frame, data transmit frame, and communication—includes a header portion in accordance with the information associated with a predetermined header of the supplemental information. At least one effect of the foregoing method is that once a node has received the information associated with the predetermined header, the node is able to generate transmit frames including the predetermined header even if noise is occurring on the communication network medium. Another effect of the foregoing method is that collection of network related information ordinarily needed for header generation is substantially reduced, thereby reducing the time required to generate a transmit frame.

In an embodiment of the method according to the invention in the first aspect the header portion includes at least a Frame Control Header (FCH), the FCH generated in conformity with the information associated with the predetermined header.

In an embodiment of the method according to the invention in the first aspect the MAP PHY frame comprises at least a preamble portion, the preamble portion to carry the information associated with the predetermined header.

In an embodiment of the method according to the invention in the first aspect the MAP PHY frame comprises at least a header portion, the header portion to carry the information associated with the predetermined header.

In a second aspect, the invention encompasses a node. The node comprises a controller and a storage memory coupled to the controller. The storage memory includes instructions to generate at least one communication for communication on a communication network medium when executed by the controller. The at least one communication includes a first portion to carry supplemental information. The supplemental information includes information associated with a predetermined header for use by a plurality of nodes communicatively coupled to a communication network, medium. The at least one communication further includes a second portion to carry payload data. In an embodiment the information associated with the predetermined header is information associated with a predetermined Frame Control Header (FCH). At least one effect of the foregoing invention in the second aspect is that once a node has received the information associated with the predetermined header, the node is able to generate transmit frames including the predetermined header even if noise is occurring on the communication network medium. Another effect of the foregoing is that collection of network related information ordinarily needed for FCH generation is substantially reduced, thereby reducing the time required to generate a transmit frame.

In an embodiment of the node according to the invention in the second aspect the first portion is a header portion, the header portion to carry the information associated with the predetermined header. In an embodiment one or more symbols of the header portion carry the information associated with the predetermined header.

An embodiment of the node according to the invention in the second aspect is adapted to perform steps of the method according to the invention in the first aspect.

In a third aspect, the invention encompasses a system. The system comprises a communication network medium and at least one node coupled to the medium. The at least one node is arranged to communicate, at least in part via the medium, a transmit frame that includes information associated with a predetermined header for use by a plurality of nodes communicatively coupled to the communication network medium. In an embodiment the information associated with the predetermined header is information associated with a predetermined Frame Control Header (FCH). At least one effect of the foregoing invention in the third aspect is that once a node has received the information associated with the predetermined header, the node is able to generate transmit frames including the predetermined header even if noise is occurring on the communication network medium. Another effect of the foregoing is that collection of network related information ordinarily needed for FCH generation is substantially reduced, thereby reducing the time required to generate a transmit frame.

In an embodiment of the system according to the invention in the third aspect the communication network medium comprises a network of electrical power distribution conductors.

In an embodiment of the system according to the invention in the third aspect the transmit frame comprises at least a preamble portion, the preamble portion to carry the information associated with the predetermined header. In an embodiment one or more symbols of the preamble portion carry the information associated with the predetermined header.

In an embodiment of the system according to the invention in the third aspect the frame comprises at least a header portion, the header portion to carry the information associated with the predetermined header. In an embodiment one or more symbols of the header portion carry the information associated with the predetermined header.

In an embodiment of the system according to the invention in the third aspect the frame is a broadcast message, the broadcast message for transmission to a plurality of nodes coupled to the communication network medium. In an embodiment the broadcast message is a mobile applications protocol (MAP) physical layer (PHY) frame communication.

In an embodiment of the system according to the invention in the third aspect at least one of the least one nodes is provided according to the invention in the second aspect. In an embodiment all of at least one nodes are provided according to the invention in the second aspect.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Various implementations, including techniques and devices, are discussed with reference to the figures. The techniques and devices discussed may be applied to any of various network designs, circuits, and devices and remain within the scope of the disclosure.

Implementations are explained in more detail below using a plurality of examples. Although various implementations and examples are discussed here and below, further implementations and examples may be possible by combining the features and elements of individual implementations and examples.

Example Communication System

Figure 1:
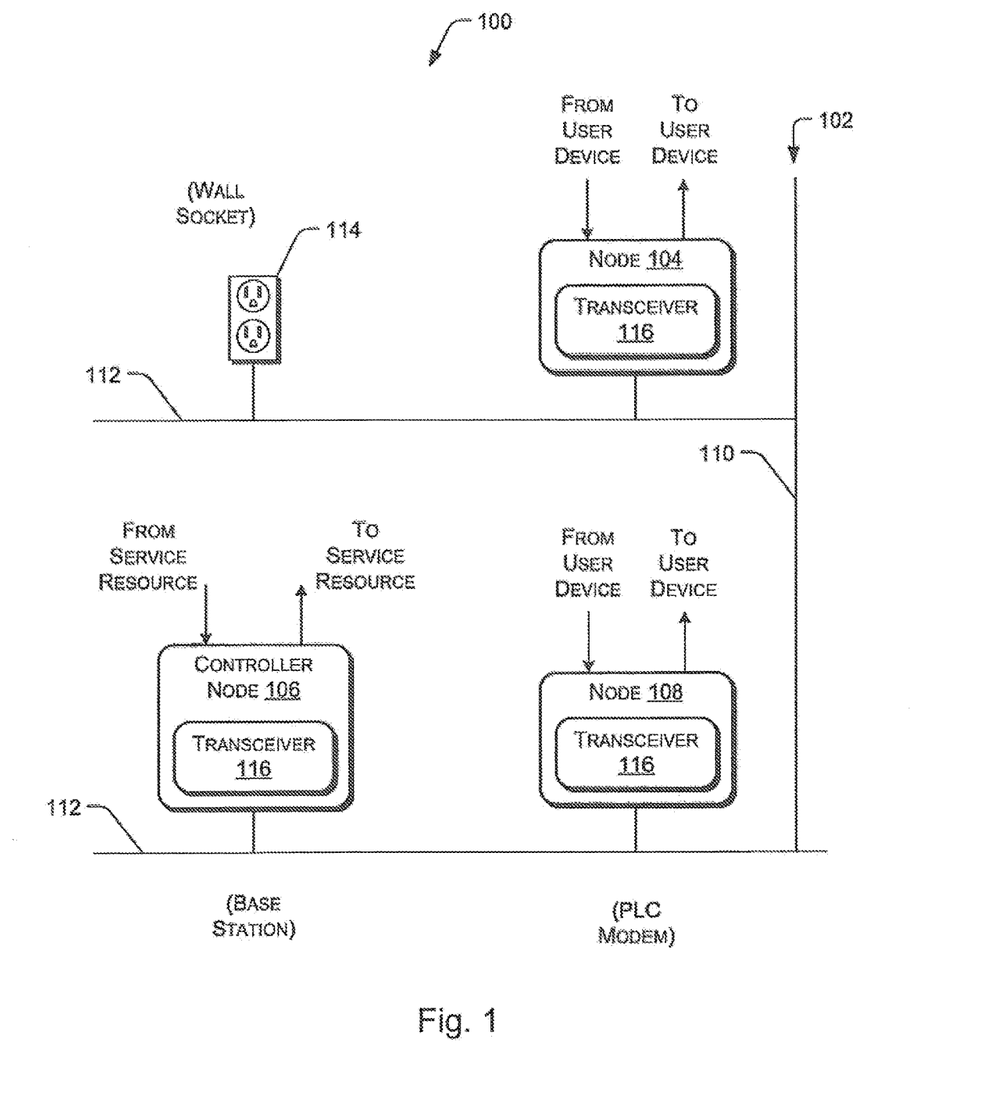
FIG. 1 is schematic of an, example network or system in which the techniques in accordance with the present disclosure may be implemented.

In one implementation, as shown in FIG. 1, a system 100 comprises a communication network medium 102 shared by at least two nodes (e.g. nodes 104, 106, and 108) coupled to the medium 102. The nodes 104-108 are arranged to communicate at least in part via the medium 102. In one implementation, the system 100 is a multicarrier arrangement or system. In various alternate implementations, the system 100 based on the communication network medium 102 comprises a single communication channel and the nodes 104-108 represent discrete homogeneous networks communicatively coupled to the single communication channel.

The medium 102 may be comprised of a trunk or feeder 110 and one or more branches 112. In one example, the system 100 is a power line communication (PLC) system. In that case, the trunk 110 and branches 112 are electrical power distribution conductors (e.g., power lines) arranged to distribute electric power to one or more end user locations (e.g., within residences, commercial or professional suites, industrial sites, etc.). In the example, nodes 104-108 are coupled to the electric power lines and arranged to communicate at least in part via the electrical power lines. While the disclosure, including the figures and the discussion herein, discuss the techniques and devices disclosed in terms of a PLC system, the techniques and devices may be used for minimizing or eliminating neighbor network interference on other types of networks (e.g., wired and/or wireless, optical, etc.) without departing from the scope of the disclosure. For example, the medium 102 may be realized as a wireless communication medium, a wire line communication medium (e.g., coaxial cable, twisted pair of copper wires, power line wiring, optical fiber, etc.), or as combinations thereof.

As shown in FIG. 1, nodes 104-108 may be coupled to the medium 102 via one or more power outlets 114. For example, a node (104-108) may be "plugged in" to a wall socket (power outlet 114). Alternately, nodes 104-108 may be hardwired to the medium 102, or may be coupled in another manner allowing communication via the medium 102 (e.g., inductive coupling, optical coupling, wireless coupling, etc.).

As shown in FIG. 1, nodes 104-108 may also have connection to and/or from user devices, service resources, and the like. For example, a node (104-108) may be communicatively coupled to a user communications device, an automation console, a surveillance hub, a power usage monitoring and/or control interface, a service provider feed, a utility connection, and so forth. In one implementation, one or more of the nodes 104-108 is a controller node 106 (e.g., base station, master node, etc.) arranged to control communication of information with regard to the network. For example, a controller node 106 may receive an entertainment feed from a service provider, and distribute content to other nodes on the network (such as nodes 104 and 108) as well as optionally provide for content consumption at the controller node 106 itself. In one case, the controller node 106 may control the type of content that is distributed to the other nodes 104 and 108, control the bandwidth used by the other nodes 104 and 108, and/or provide other control functions. Furthermore, in one implementation, the controller node 106 may distribute a broadcast frame may include an instruction requiring nodes that receive the broadcast frame to use a predetermined FCH. The predetermined FCH may include configuration information, such as the usable subchannels, the modulation and coding scheme, and the MAP message length for the current frame.

In one implementation, one or more of the nodes 104-108 may include a multicarrier apparatus, transmitter, receiver, transceiver, modem, or the like, (generically referred to herein as a "transceiver 116") for communication via the network. Accordingly, the nodes 104-108 may include structure and functionality that enable signal communication over the medium 102. Such structure and functionality may include one or more antennas, integrated wire line interfaces, and the like. Depending on the implementation, the nodes 104-108 may communicate with one another directly (peer-to-peer mode) or the nodes 104-108 may communicate via the controller node 106. In one implementation, the nodes 104-108 are Orthogonal Frequency Division Multiplexing (OFDM) apparatuses capable of implementing the herein described implementations. For example, the nodes 104-108 may include a transceiver and/or a controller, as is discussed below.

In one implementation, system 100 may be a home network and one or more of the nodes 104-108 may be an access point of the home network. For example, in the implementation the controller node 106 may be a residential gateway that distributes broadband services to the other nodes (e.g., nodes 104 and 108). The nodes 104-108 may be associated with digital content destinations in the home, but may also be associated with digital content sources, such as digital video recorders (DVR), computers providing streaming video, televisions, entertainment centers, and the like.

Furthermore, the nodes 104-108 may be enabled to communicate using packet-based technology (e.g., ITU G.hn, HomePNA, HomePlug® AV and Multimedia over Coax Alliance (MoCA)) and xDSL technology). Such xDSL technology may include Asymmetric Digital Subscriber Line (ADSL), ADSL2, ADSL2+, Very high speed DSL (VDSL), VDSL2, G.Lite, and High bit rate Digital Subscriber Line (HDSL). In addition, the nodes 104-108 may be enabled to communicate using IEEE 802.11 and IEEE 802.16 (Wi-MAX) wireless technologies.

Figure 2:
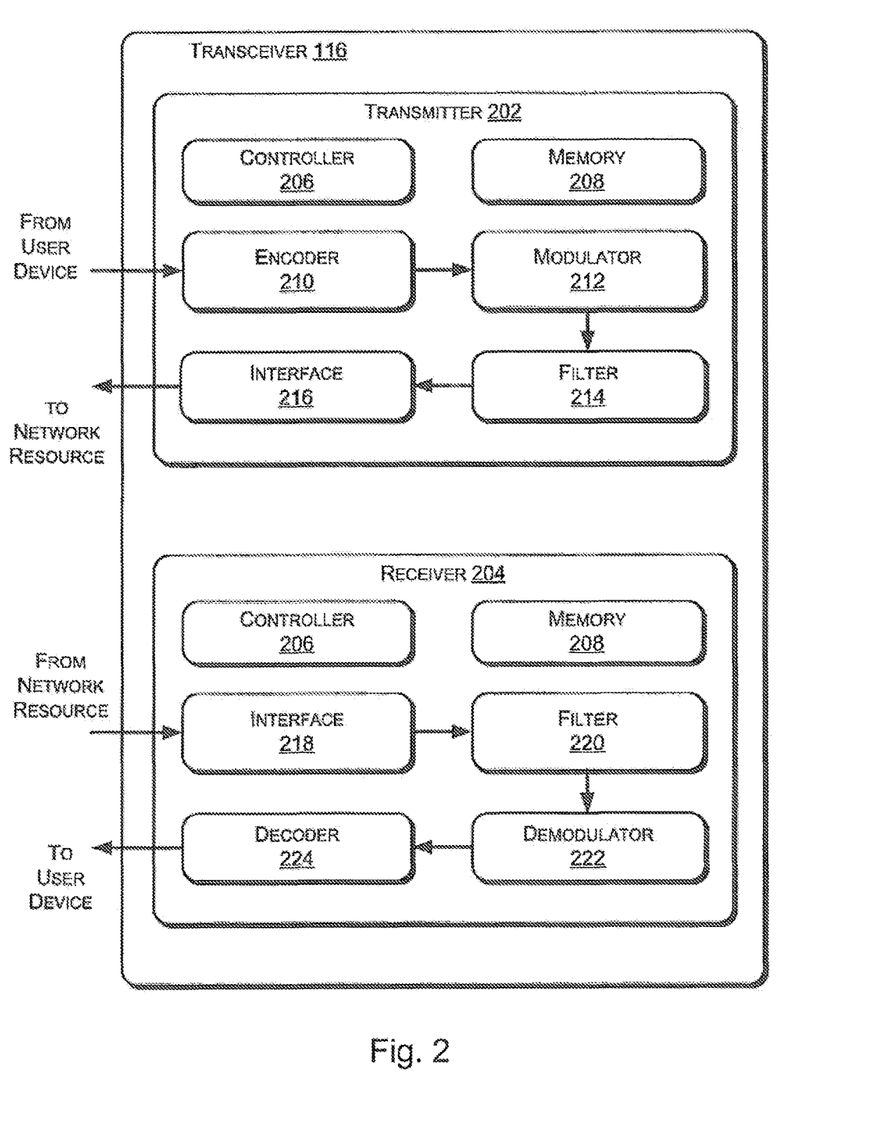
FIG. 2 is a block diagram illustrating one example of a node implemented as part of the network of FIG. 1.

In the example of FIG. 1, each of the nodes is shown having a transceiver 116. An example transceiver 116 is illustrated in FIG. 2. The transceiver 116 may include a transmitter portion 202 and/or a receiver portion 204, where one or both of the portions may include a controller 206 and/or memory 208. In various implementations, a single controller 206 may be shared by the transmitter 202 and the receiver 204. Likewise, in some implementations, a single memory 208 may be shared by the transmitter 202 and the receiver 204, or alternately the memory 208 may be comprised of multiple memory devices distributed in one or more of the transceiver 116, the transmitter 202, and the receiver 204.

As used herein, the term "controller 206" is meant generally to include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, secure microprocessors, and application-specific integrated circuits (ASICs). Such digital processors may be contained on a single unitary IC die, or distributed across multiple components. If included, the controller 206 may direct the flow of information through the transceiver 116, may provide timing to the components of the transceiver 116, may determine MAC cycle synchronization or alignment.

If included, the memory 208 may store executable instructions, software, firmware, operating systems, applications, preselected values and constants, and the like, to be executed or used by the controller 206, for example. In various implementations, the memory 208 may include computer-readable media. Computer-readable media may include, for example, computer storage media. Computer storage media, such as memory 208, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device (such as the controller 206). Although the computer storage media (memory 208) is shown within the transceiver 116 it will be appreciated that the memory 208 may be distributed or located remotely and accessed via a network or other communication link.

As shown in FIG. 2, an example transmitter 202 may include an encoder 210, a modulator 212, a filter 216, and an interface 214. In alternate implementations, a transmitter 202 may include fewer components, alternate components, or additional components and remain within the scope of the disclosure.

In an implementation, signals exchanged between the nodes 104-108 may include multicarrier symbols that each includes a plurality of tones or subchannels. Each of the tones within a multicarrier symbol may have data bits modulated thereon that are intended for delivery from one of the nodes 104-108 to another. In an implementation, the transmitter 202 is arranged to modulate the data bits onto the tones and transmit the signals including the tones via the medium 102.

If included, the encoder 210 is arranged to receive data (e.g., from a user device) for communication to a receiving device coupled to the transceiver 116 via a wireless or wire line medium 102. More specifically, the encoder 210 is arranged to translate incoming data bit streams into in-phase and quadrature components for the plurality of tones. The encoder 210 may be arranged to output a number of symbol sequences that are equal to the number of tones available to the system 100.

If included, the modulator 212 is arranged to receive symbol sequences (e.g., from the encoder 210) to produce a modulated signal in the form of a discrete multi-tone signal. The modulator may pass the modulated signal to the filter 214 (if the filter is included) to undergo various filtering. In one implementation, the filtered signal is passed to the interface 216 for communication over the medium 102 to a receiving device. For example, the interface 216 may facilitate communication of the modulated signal to a network resource such as an automation control center, a surveillance hub, and the like.

In various implementations, the transceiver 116 may also include a receiver 204 that is capable of receiving modulated multi-tone signals communicated over the medium 102 from a transmitting device. As shown in FIG. 2, an example receiver 204 may include an interface 218, a filter 220, a demodulator 222, and a decoder 224. In alternate implementations, a receiver 204 may include fewer components, alternate components, or additional components and remain within the scope of the disclosure.

In one implementation, signals received by the receiver 204 may be passed to the filter 220 via the interface 218. The interface 218 may facilitate communication with a network resource, for example. After received signals undergo filtering by way of the filter 220 (if included), the filtered signals may be demodulated by the demodulator 222. The demodulated signals may be passed to and processed by the decoder 224.

If included, the decoder 224 produces data bit streams for consumption by a computing device, or the like. Effectively, the demodulator 222 and the decoder 224 perform the opposite functions of the modulator 212 and the encoder 210, respectively.

In various implementations, one or more of the controller 206, encoder 210, decoder 224, modulator 212, demodulator 222, interface 216 and/or 218, filter 214 and/or 220, as well other components, may be implemented in hardware, firmware, software, or the like, or in combinations thereof.

Exemplary implementations discussed herein may have various components collocated; however, it is to be appreciated that the various components of the system 100 may be located at distant portions of a distributed network, such as a communications network and/or the Internet, or within a dedicated secure, unsecured and/or encrypted arrangement. Thus, it should be appreciated that the components of the system 100 may be combined into one or more apparatuses, such as a modem, or collocated on a particular node of a distributed network, such as a telecommunications network. Moreover, it should be understood that the components of the described system 100 may be arranged at any location within a distributed network without affecting the operation of the system 100. For example, the various components can be located in a Central Office modem (CO, ATU-C, VTU-O), a Customer Premises modem (CPE, ATU-R, VTU-R), an xDSL management device, or some combination thereof.

Similarly, one or more functional portions of the system 100 may be distributed between a modem and an associated computing device.

Example Operations

Successful communications in communication networks (e.g., ITU-T G.9960/G.9961 IEEE 1901 FFT, IEEE 1901 Wavelet, etc.) using a communication medium (such as medium 102, for example) generally requires the detection of communicated packets of information.

Figure 3:
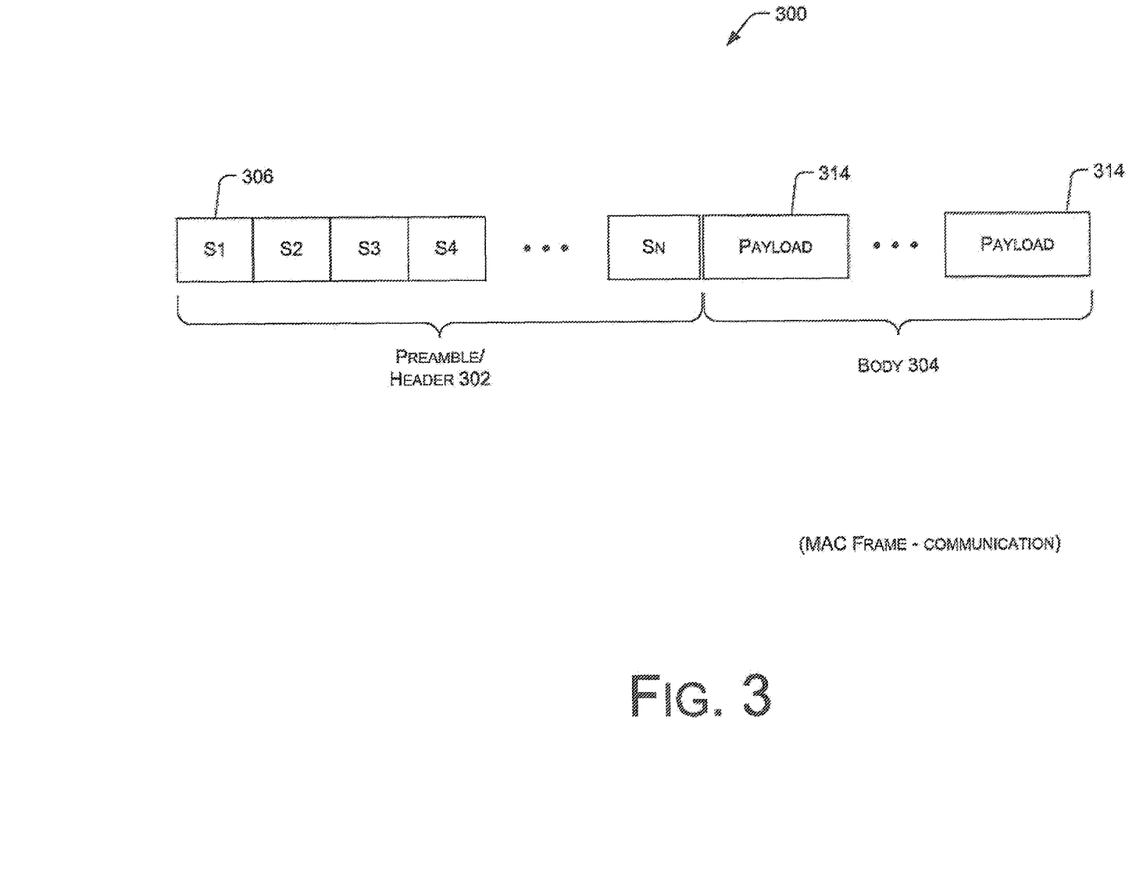
FIG. 3 is a schematic of an example communication block, according to an implementation.

FIG. 3 is a schematic of an example communication 300, according to an implementation. In the implementation, a node 104-108 or a neighbor node or network may periodically transmit a communication 300 as part of its operation, to inform other nodes or networks, among other things, of the node's timing information and/or synchronization. For example, a controller 206 at a node 104-108 may execute instructions stored in a memory 208 at the node 104-108 to generate and/or transmit the communication 300 via the medium 102. In one implementation, the communication 300 is a MAP physical layer (PHY) frame communication. Similarly, a controller 206 at a node 104-108 may execute instructions stored in a memory 208 at the node 104-108 to receive and/or decode the communication 300 transmitted on the medium 102.

In one implementation, as shown in FIG. 3, the communication 300 includes a preamble/header portion 302 and a body portion 304. Although the preamble/header portion 302 is shown as being contiguous, it is also contemplated that the preamble and header may be two separate and distinct elements of the communication 300. The preamble/header portion 302 serves at least to alert all nodes to receive the communication 300 that the communication 300 is arriving on the medium 102. The preamble/header portion 302 may include a known sequence of 1's and 0's that allows time for one or more of the nodes 104-108 to detect the communication 300 and enter a state to receive data. The preamble/header portion 302 may also convey the length (in μsec) of the body portion 304, or the length individual payload sections of the body portion 304. Furthermore, the preamble/header portion 302 may include the FCH. The FCH may include frame configuration information, such as the usable subchannels, the modulation and coding scheme, and the MAP message length for the current frame, and for subsequent frames generated and communicated on communication network medium 102.

As illustrated in FIG. 3, the preamble/header portion 302 may be defined by S1, S2, S3, S4 . . . Sn symbols. A plurality of the S1, S2, S3, S4 . . . Sn symbols may be used for packet detection, timing estimation and frame synchronization, another one or more of the plurality of the S1, S2, S3, S4 . . . Sn symbols may be used to convey the length of the body portion 304, and another one or more of the plurality of the S1, S2, S3, S4, . . . Sn symbols may be used to convey supplemental information.

In one implementation, the supplemental information may include predetermined FCH instructions. The predetermined FCH instructions indicate to a node 104-108 that it is to generate transmit frames for communication to include a predetermined FCH. More specifically, a node 104-108 is to generate transmit frames that include the predetermined FCH, and all nodes the predetermined FCH instructions are to generate transmit frames with the predetermined FCH.

Figure 4:
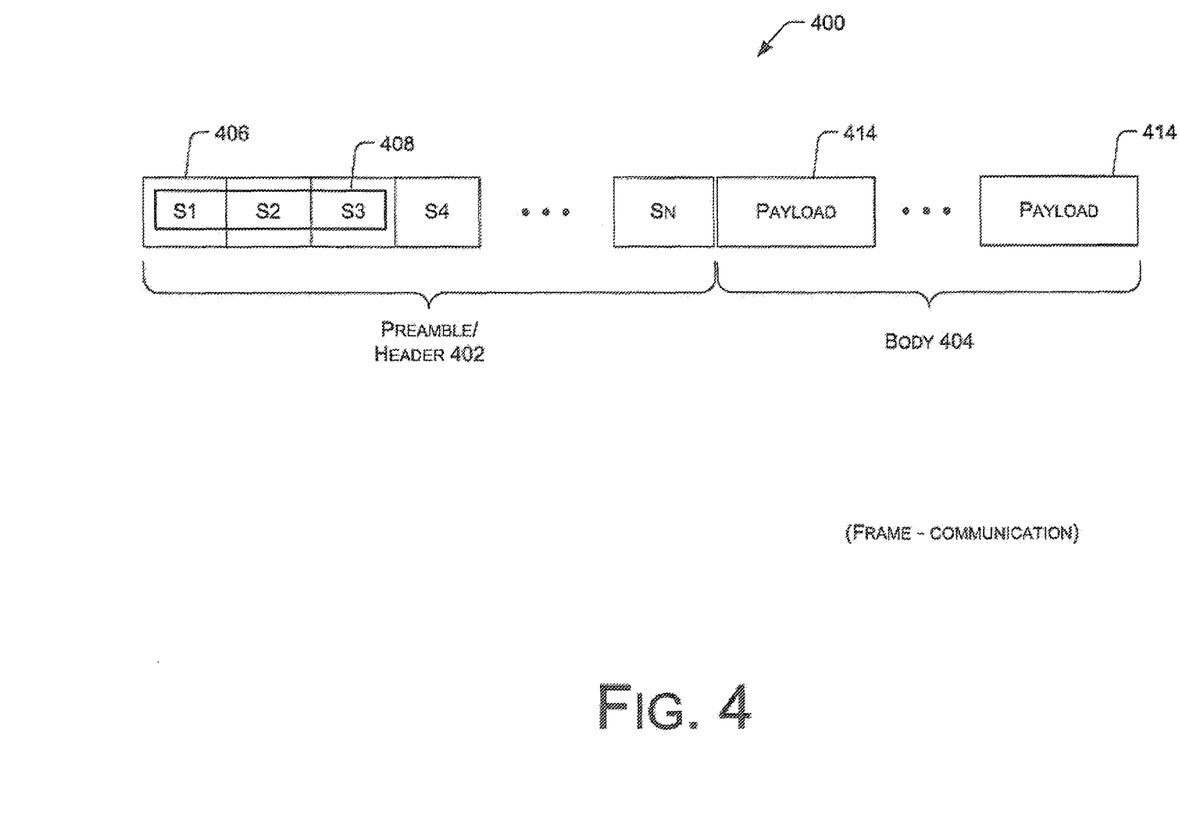
FIG. 4 is a schematic of an example communication block, according to an implementation.

FIG. 4 is a schematic of an example communication 400, according to an implementation. In one implementation, the communication 400 (e.g., transmit frame) includes a preamble/header portion 402 and a body portion 404. Although the preamble/header portion 402 is shown as being contiguous, it is also contemplated that the preamble and header may be two separate and distinct elements of the communication 400. The preamble/header portion 402 serves at least to alert all nodes 104-108 to receive the communication 400 that the communication 400 is arriving on the medium 102. The preamble/header portion 402 may include a known sequence of 1's and 0's that allows time for the nodes to detect the communication 300 and enter a state to receive data. The preamble/header portion 402 may also convey the length (in μsec) of the body portion 404, or the length individual payload sections of the body portion 404.

As illustrated in FIG. 4, the preamble/header portion 402 may be defined by S1, S2, S3, S4 . . . Sn symbols. A plurality of the S1, S2, S3, S4 . . . Sn symbols may be used for packet detection, timing estimation and frame synchronization (e.g., FCH related information), another one or more of the plurality of the S1, S2, S3, S4 . . . Sn symbols may be used to convey the length of the body portion 404, and another one or more of the plurality of the S1, S2, S3, S4 . . . Sn symbols may be used to convey supplemental information. In this example, the group of symbols S1-S3, shown by reference numeral 408, comprise the predetermined FCH. In one implementation, the group of symbols S1-S3 408 comprising the FCH may include frame configuration information, such as the usable subchannels, the modulation and coding scheme, and the MAP message length for the current transmit frame, in accordance with supplemental information received in a broadcast message or MAP PHY frame transmitted by a node (e.g., a controller node 106).

In alternate implementations, one or more of the above techniques may be employed concurrently, or another technique may be used to accomplish the same or similar results. The implementations herein are described in terms of exemplary embodiments. However, it should be appreciated that individual aspects of the implantations may be separately claimed and one or more of the features of the various embodiments may be combined.

Representative Processes

Figure 5:
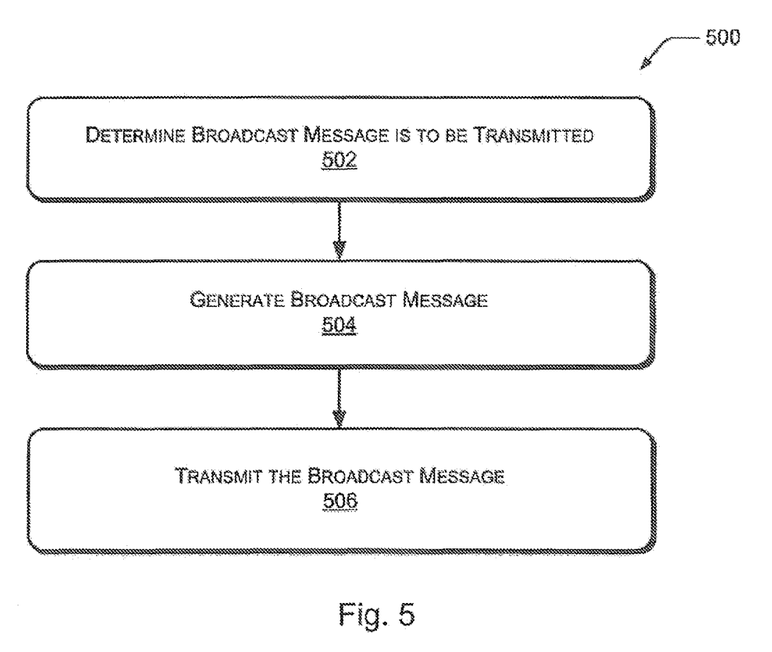
FIG. 5 illustrates a representative process for generating a communication at a node that includes supplemental information that predetermined header information.

FIG. 5 illustrates a representative process 500 for generating a communication (e.g., communication 300) at a node (e.g., nodes 104-108) that includes supplemental information comprising predetermined header information that may be used by one or nodes to generate a predetermined header that is to be used by all or substantially all nodes communicating in a network. The described techniques may also be used with domains, networks, and the like. An example process 500 may be performed on a system 100, for example, where a common network communication medium 102 is shared. However, other communication media may also be used with the representative process 500. In one example, the communication network medium 102 comprises a single communication channel and at least two nodes (such as one or more of the nodes 104-108) representing discrete homogeneous networks are communicatively coupled to the single communication channel. The process 500 is described with reference to FIGS. 1-4.

At block 502, a node (such as nodes 104-108) determines that a broadcast message is to be transmitted. The determination to transmit a broadcast message may be based on a plurality of factors. Typical factors may include facilitating discovery, initiating network maintenance, providing route discovery, conveying information, etc. In one example, the broadcast message may be a communication 300. In one implementation, the broadcast message is a mobile application protocol (MAP) physical layer (PHY) frame.

At block 504, the node generates the broadcast message. The broadcast message includes a preamble/header portion and a body portion. The preamble/header portion may be defined by S1, S2, S3, S4 . . . Sn symbols. A plurality of the S1, S2, S3, S4 . . . Sn symbols may be used for packet detection, timing estimation and frame synchronization, another one or more of the plurality of the S1, S2, S3, S4 . . . Sn symbols may be used to convey the length of the body portion, and another one or more of the plurality of the S1, S2, S3, S4 . . . Sn symbols may be used to convey supplemental information. In one implementation, the supplemental information may include information comprising predetermined header information that may be used by one or nodes to generate a predetermined header that is to be used by all or substantially all nodes communicating in a network. The predetermined header information reference indicates to a node that communication (e.g., data transmit frame) generated thereby is to include a header generated in accordance with the predetermined header information. In one implementation, the predetermined header information includes an instruction that all transmit frames generated thereby are to include a header generated in conformity with the predetermined header information. In one implementation, the predetermined header information includes an instruction that all transmit frames generated by the receiving node are to include a FCH generated in conformity with the predetermined header information.

At block 506, the broadcast message is transmitted by the node on the communication medium. In one implementation, the broadcast message is transmitted on the communication medium for reception by one or more nodes that are associated with the communication medium. In another implementation, the broadcast message is transmitted to one or ore particular nodes.

Figure 6:
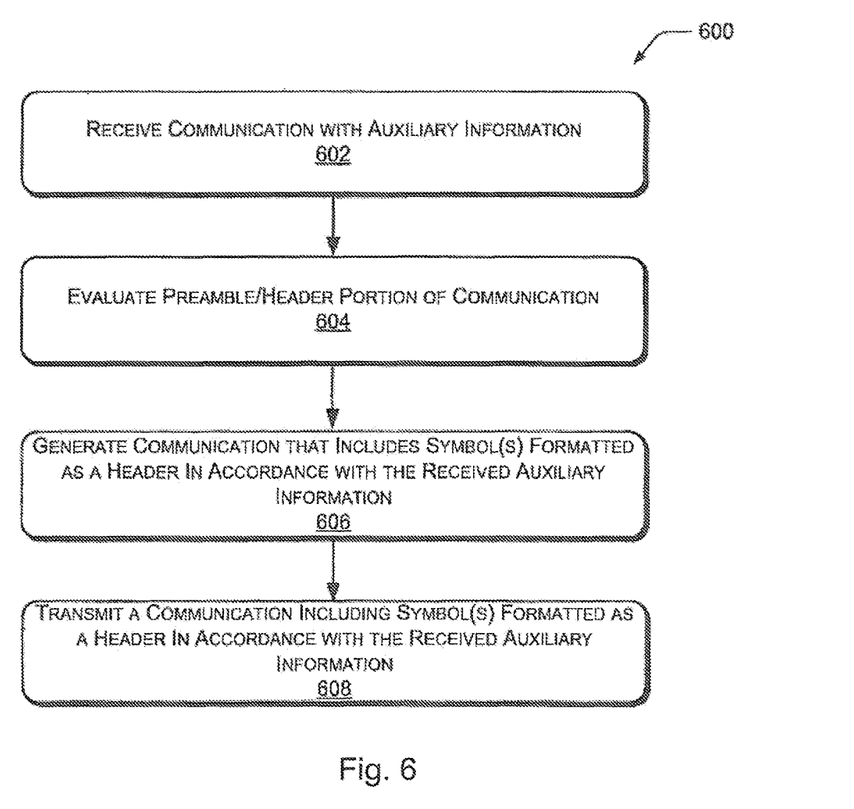
FIG. 6 illustrates a representative process for generating a communication at a node that includes one or more symbols generated in accordance with supplemental information conveyed in a communication.

FIG. 6 illustrates a representative process 600 for generating a communication (e.g., communication 400) at a node (e.g., nodes 104-108) that includes a predetermined header portion in accordance with supplemental information conveyed in a communication (e.g., communication 300). The described techniques may also be used with domains, networks, and the like. An example process 600 may be performed on a system 100, for example, where a common network communication medium 102 is shared. However, other communication media may also be used with the representative process 600. In one example, the communication network medium 102 comprises a single communication channel and at least two nodes (such as one or more of the nodes 104-108) representing discrete homogeneous networks are communicatively coupled to the single communication channel. The process 600 is described with reference to FIGS. 1-5.

At block 602, a communication (e.g., communication 300) is received at a node (e.g., nodes 104-108). The communication includes a preamble/header portion and a body portion. The preamble/header portion may be defined by S1, S2, S3, S4 . . . Sn symbols. A plurality of the S1, S2, S3, S4 . . . Sn symbols may be used for packet detection, timing estimation and frame synchronization, another one or more of the plurality of the S1, S2, S3, S4 . . . . Sn symbols may be used to convey the length of the body portion, and another one or more of the plurality of the S1, S2, S3, S4 . . . Sn symbols may be used to convey supplemental information. In one implementation, the supplemental information may include information comprising predetermined header information that may be used by one or nodes to generate a predetermined header that is to be used by all or substantially all nodes communicating in a network. The predetermined header information reference indicates to a node that a communication (e.g., data transmit frame) generated thereby is to include a header generated in accordance with the predetermined header information. In one implementation, the predetermined header information includes an instruction that all transmit frames generated thereby are to include a header generated in conformity with the predetermined header information. In one implementation, the predetermined header information includes an instruction that all transmit frames generated by the receiving node are to include a FCH generated in conformity with the predetermined header information.

At block 604, the node receiving the communication evaluates at least the preamble/header portion of the communication to determine that supplemental information is associated with one or more symbols of the preamble/header portion of the communication.

At block 606, the node receiving the communication generates a communication (e.g., communication 400) that includes one or more symbols formatted in accordance with the supplemental information contained in the communication received at block 602. In one implementation, the generated communication includes one or more symbols formatted as a header in accordance with the predetermined header information. In another implementation, the generated communication includes one or more symbols formatted as an FCH in accordance with the predetermined header information.

At block 608, the process includes transmitting a communication (such as communication 400) including one or more symbols formatted as a header in accordance with the predetermined header information.

The order in which the processes 500 and 600 are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable hardware, software, firmware, or a combination thereof, without departing from the scope of the subject matter described herein.

In alternate implementations, other techniques may be included in the processes 500 and 600 in various combinations, and remain within the scope of the disclosure.

Although the supplemental information is described as being conveyed a frame's preamble/header portion, this is by way of example only. Other implementations convey such supplemental information in a body, preamble, or header of a frame, or a combination of such portions of a frame.

In one implementation, the predetermined header information, which may be used by a node to generate a predetermined header for inclusion in a data frame, may be based on network noise levels observed by a controller node and/or other nodes, instructions from upper level management systems (e.g., user settings), information from neighboring networks or domains, and/or other information available in the system.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium (such as memory 208), executed on programmed general-purpose computer with the cooperation of a controller (such as controller 206) and memory 208, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:
1. A node configured to operate in a network of nodes, the node comprising:

a controller; and a storage memory coupled to the controller; wherein the memory stores instructions, that when executed by the controller cause the controller to:

generate a communication that includes a first portion and a second portion, wherein the second portion carries payload data and the first portion carries frame configuration information and supplemental information;

wherein the frame configuration information describes a predetermined frame control header (FCH) that defines frame configuration parameters for the network and comprises information that identifies a selected FCH selected from a set of FCHs as the predetermined FCH;

wherein the supplemental information comprises predetermined header information that is used by the nodes to generate the predetermined header to be used by all nodes communicating in the network and an instruction to each node receiving the communication to include the predetermined FCH in subsequent transmission frames generated by the node;

further wherein a set of one or more symbols of the predetermined FCH is used to convey the supplemental information; and transmit the communication to the nodes in the network to cause the nodes to include the same predetermined FCH in transmission frames transmitted by the nodes.

2. The node of claim 1, wherein the frame configuration parameters include one or more of usable subchannels, modulation and coding scheme, or media access protocol message length.

3. A system, comprising:
a communication network medium;
a first node coupled to the medium, and
a plurality of further nodes, each of the plurality of further nodes being configured to:

receive a frame from the first node, wherein the frame includes a first portion and a second portion, wherein the second portion carries payload data and the first portion carries frame configuration information and supplemental information, wherein the frame configuration information describes a predetermined frame control header (FCH) that defines frame configuration parameters for the network and comprises information that identifies a selected FCH selected from a set of FCHs as the predetermined FCH;

wherein the supplemental information comprises predetermined header information that is used by the nodes to generate the predetermined header to be used by all nodes communicating in the network and an instruction to each node receiving the communication to include the predetermined FCH;

further wherein a set of one or more symbols of the predetermined FCH is used to convey the supplemental information; and generate transmission frames including the predetermined FCH, such that transmission frames from the plurality of further nodes include the same predetermined FCH.

4. The system of claim 3, wherein the communication network medium comprises a network of electrical power distribution conductors.

5. The system of claim 3, wherein the frame configuration parameters include one or more of usable subchannels, modulation and coding scheme, or media access protocol message length.

6. The system of claim 3, wherein the frame is a broadcast message that is transmitted to all of the plurality of further nodes.

7. The system of claim 6, wherein the broadcast message is a media access protocol (MAP) physical layer (PHY) frame communication.

8. A method, comprising:
decoding, at a node, a media access protocol (MAP) physical layer (PHY) frame, the MAP PHY frame including a first portion and a second portion, wherein the second portion carries payload data and the first portion carries frame configuration information and supplemental information;

wherein the frame configuration information describes a predetermined frame control header (FCH) that defines frame configuration parameters for a network and comprises information that identifies a selected FCH selected from a set of FCHs as the predetermined FCH;

wherein the supplemental information comprises predetermined header information that is used by the nodes to generate the predetermined header to be used by all of a plurality of nodes communicating in the network and an instruction to each node receiving the communication to include the predetermined FCH header in transmission frames generated by the node;

further wherein a set of one or more symbols of the predetermined FCH is used to convey the supplemental information;

generating a further frame, the further frame including the predetermined FCH; and transmitting the further frame.

9. The method of claim 8, further comprising generating a frame to include a header that comprises a Frame Control Header (FCH) generated in conformity with the frame configuration information.

10. The method of claim 8, wherein the MAP PHY frame comprises at least a preamble portion, the preamble portion to carry the frame configuration information.

11. The method of claim 8, wherein the MAP PHY frame comprises at least a header portion, the header portion to carry the frame configuration information associated with the predetermined header.

12. The method of claim 8, wherein the MAP PHY frame is a broadcast message.

13. The method of claim 8, wherein the frame configuration information is information associated with a Frame Control Header (FCH).

* * * * *